United States Patent [19]

Monett

[11] Patent Number: 5,050,169
[45] Date of Patent: Sep. 17, 1991

[54] METHOD AND APPARATUS FOR TESTING MAGNETIC DISKS

[75] Inventor: Michael R. Monett, Santa Clara, Calif.

[73] Assignee: Memory Technology, Boulder, Colo.

[21] Appl. No.: 355,979

[22] Filed: May 23, 1989

[51] Int. Cl.$^5$ .............................................. G06F 11/00
[52] U.S. Cl. .................................. 371/21.2; 371/68.1
[58] Field of Search ...................... 371/21.1, 21.3, 21.1, 371/68.1, 24, 40.1; 269/36, 37, 38, 39, 178, 195, 199; 360/98.01, 31; 364/200, 900

[56] References Cited

U.S. PATENT DOCUMENTS

| | | | |
|---|---|---|---|
| 4,387,452 | 6/1983 | Bricot | 369/199 X |
| 4,630,269 | 12/1986 | Gershenson | 371/21.2 X |
| 4,722,085 | 1/1988 | Flora | 364/200 X |
| 4,817,035 | 3/1989 | Timsit | 364/900 |
| 4,847,807 | 7/1989 | Yule | 364/900 |
| 4,860,259 | 8/1989 | Tobita | 371/21.2 X |

Primary Examiner—Robert W. Beausoliel

[57] ABSTRACT

An apparatus for testing of multiple disks in a disk drive, and a method for testing utilizing the apparatus. Disks in a disk stack have associated read/write heads, and multiple read/write heads are controlled by read/write controllers. The controllers are controlled by chip select lines, and the read/write heads are selected via a head select bus. The disk stack is rotated by means of a motor or other rotation mechanism, and data is written onto tracks on surfaces of the disks by means of the read/write heads. A given head is selected by selecting its associated controller, and selecting the head code for that particular head. Multiple controllers may be selected at one time, with one head per controller engaged for the write function at a given time, such that several heads may be written at a time for speeding up the write proces in a disk testing procedure. In an alternative embodiment, several heads may be accessed per controller at one time. Test data is written onto each track on each surface of the disks by accessing all of the heads for each controller, and then the data is read out by accessing the read/write heads one at a time, and comparing the readout data with the written data for detecting faults on the surfaces of the disks. The method may be utilized with conventional head disk assemblies by disabling standard write unsafe lines, which normally prevent the enabling of more than one read/write controller at a time. The procedure is governed by a microprocessor, which controls each of the input, output and select lines.

17 Claims, 2 Drawing Sheets

METHOD AND APPARATUS FOR TESTING MAGNETIC DISKS

BACKGROUND OF THE INVENTION

In the production of magnetic disks and disk drives for computers, an important step in the production process is the testing of the disks to locate defects thereof. Due to high volume of production, it is extremely important to quickly and reliably locate defects which may occur in the manufacture of the disk drives.

A typical magnetic disk or a platter has recording surfaces on both sides, and conventionally a plurality of such disks are included in a head disk assembly (HDA). For example, personal computers now commonly use HDAs. A read/write head is positioned near each surface, and several read/write heads are governed by a read/write control chip.

Typically, one head is associated with each surface of a given disk, although there may be more than one head coupled with a disk surface or side in certain apparatus. The disks in a head disk assembly are generally configured into a parallel disk stack. Typically, the disk stack is constantly spinning, and each time a read/write control chip causes a head to write on a given track on one side of a disk, the disk stack rotates once.

Governed by control signals external to the head disk assembly, each chip causes each head which it controls to write data onto, and read data from, a given track of the associated surface of the magnetic disk. In the standard testing process, the heads are accessed in one at a time by the read/write control chips. Each track is written during one revolution of the disks. Since each head is selected one at a time, the total number of revolutions required to write a complete cylinder can be determined. A cylinder is the group of tracks of all the disks which are accessed by the heads when the heads are at a given radial position. The heads are moved together radially inwardly and outwardly to access different cylinders.

The number of revolutions for writing a given cylinder in conventional apparatus is equal to the number of heads. In order to test the entire HDA, the write process must first be carried out with test data for each track, and the number of revolutions required is the number of heads times the number of tracks. Each time test data is written onto a track of a disk, it is then read out by the same read/write head, and again the heads are accessed for this purpose in a serial fashion by the read/write control chips. The data which is read out is analyzed for determining whether errors were introduced into the data by the write/read process, attributable to defects on the disks.

Since the read/write heads are accessed in a serial fashion both for the write function and for the read function, the total number of rotations required for conventional analysis is 2 times 12N or 24N rotations, in the example of a 6-disk stack with 12 sides for testing and N tracks per side. In general, the total number of rotations or revolutions required for a given stack will be $2 \times S \times D \times N$, where D is the number of disks in the stack and S is the number of sides per disk to be tested.

SUMMARY OF THE INVENTION

The above procedure is a time-consuming and hence expensive manner of testing magnetic disks. It is accordingly an object of this invention to provide a method and apparatus for the testing of magnetic disks requiring less time and expense to carry out the testing process.

It is a specific object of the invention to provide such a method and apparatus requiring fewer revolutions of a given disk stack than in conventional systems.

It is a further object of the invention to provide such a method and apparatus wherein all of the control chips for the read/write heads of a disk drive can be accessed simultaneously, for writing a given track of all disks in a disk drive simultaneously.

Thus, in the present invention, multiple heads are coupled to read/write controllers, which are controlled via chip select lines by a microprocessor. A head select bus is coupled to each of the controllers, for accessing each of the heads coupled to the controllers. Each head is associated with one surface of a disk in a disk stack, and data is input into input lines coupled to the controllers. There are also output lines coupled to the controllers. The present method and apparatus may be achieved by modifying standard head disk arrays so as to bypass or disable the write unsafe line of such arrays, i.e., the line which normally prevents access to more than one read/write controller at a time. Thus, all of the read/write controllers in a head disk array may be accessed simultaneously, and test data may be written onto surfaces of the disks via the read/write heads, thereby decreasing the amount of write time utilized by a factor equal to the number of read/write controllers in the head disk array. In an alternative embodiment, multiple heads for a given controller may be accessed simultaneously, further decreasing the time required for the write operation. Once all of the surfaces of the disks have been written with test data, the data is read out over the output lines, and is analyzed in a conventional fashion for detecting errors or faults in the surfaces of the disks.

DESCRIPTION OF THE PREFERRED EMBODIMENTS

Figure 1:
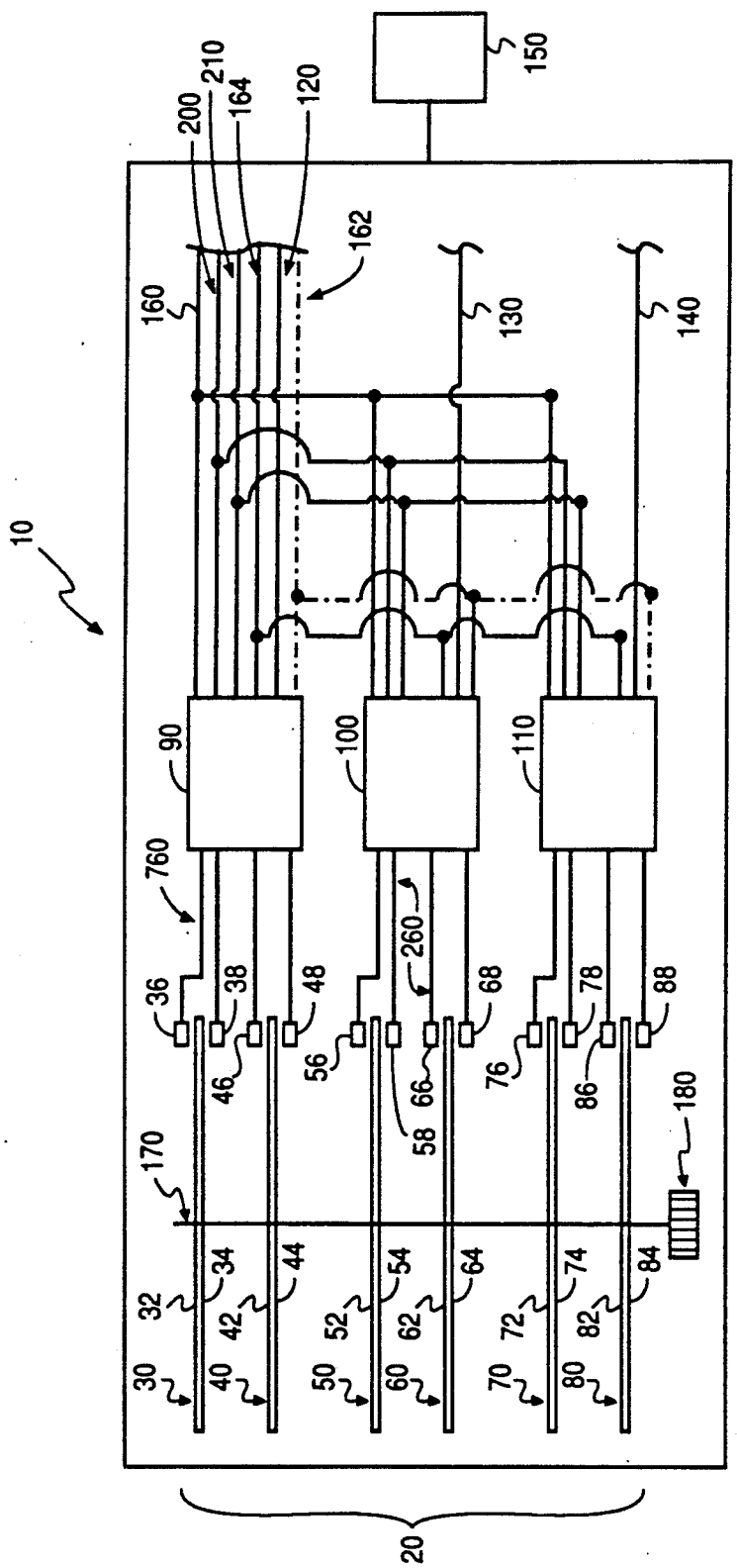
FIG. 1 shows a head disk assembly incorporating apparatus of the invention.

FIG. 1 shows a head disk assembly 10 including a vertical stack 20 of disks 30, 40, 50, 60, 70 and 80. The disk 30 has a first side 32 and a second side 34, which are the upper and lower sides shown in FIG. 1. Likewise, disks 40–80 have upper and lower sides 42–44 through 82–84, respectively. The disks 30–80 are coupled via an axle or other rotating coupler 170 to a motor or rotator 180, which are utilized to spin the disks in a manner known in the art.

The head disk assembly 10 includes at least one read/write head associated with each side of each disk. Thus, heads 36 and 38 are positioned adjacent sides 32 and 34, respectively, for writing data onto those sides and for reading data from those sides. Similarly, heads 46–48, 56–58, 66–68, 76–78 and 86–88 are positioned for reading the upper and lower sides 42–44, 52–54, 62–64, 72–74 and 82–84, respectively, of the disks 40–80.

The assembly 10 includes amplifiers 90, 100 and 110. Amplifier 90 is coupled to the heads 36, 38, 46 and 48;

amplifier 100 is coupled to the heads 56, 58, 66 and 68; and amplifier 110 is coupled to the heads 76, 78, 86 and 88. The following description of the amplifier 90 and its associated heads 36, 38, 46 and 48 applies equally to the amplifiers 100 and 110, and their associated heads. In the preferred embodiments, the amplifiers 90-110 may each be coupled to between two and eight heads, although other numbers of heads per amplifier are possible. The amplifiers 90, 100 and 110 may also be referred to as "chips" herein, since typically the amplifier will be included on a chip.

Each amplifier or chip 90-110 is controlled by a chip select line 120, 130 and 140, respectively, which are in turn controlled by a microprocessor 150 or other control device. Each of the lines shown in FIG. 1 as broken off on the right side thereof is connected to the microprocessor 150, which includes programming instructions for controlling the testing process discussed herein.

The assembly 10 is provided with an input or write line 200 and an output or read line 210, each of which is connected in parallel to the amplifiers 90, 100 and 110. Thus, during the write and read processes discussed below, the test data is input to the heads 36 through 88 by means of the input line 200, and is output by means of the output line 210.

In a conventional method for testing the disks 30-80, a given chip select line (such as line 120) is selected, and a particular head for that chip is also selected. The apparatus of FIG. 1 includes a head select bus 160 which is controlled by the microprocessor 150, and is connected to an input of each of the amplifiers 90, 100 and 110. Typically, the head select bus 160 will carry a binary code for accessing one of the four heads coupled to each of the amplifiers 90-110. It will be appreciated that the bus 160 includes sufficient lines to address the maximum number of heads accessed by a chip; in the embodiment shown in FIG. 1, two lines are sufficient to access the four heads per chip. In addition, a read/write control line is utilized for enabling the read and write procedures.

Thus, selection of chip select line 120, along with providing one of four head select codes (such as 00, 01, 10 or 11) on the head select bus 160 will uniquely access one of the heads 36, 38, 46 or 48 coupled to chip 90. Standard disk drives include a "write unsafe" line, represented for reference in dotted fashion as line 162 in FIG. 1. In conventional apparatus, this line is coupled to each chip, and is also coupled to the microprocessor 150, for determining whether more than one chip is selected at a time. If this occurs, the disk drive is shut down, because the activation of more than one chip signifies an error condition, wherein more than one disk would be written with the same data. Such a situation is unacceptable for normal usage of a disk drive, i.e. for data storage.

The present invention, however, is directed to testing method and apparatus wherein it is advantageous to execute multiple, simultaneous writes onto a plurality of disks. Thus, in the present invention the write unsafe line 162 is not used; if it is present in a given disk drive, the apparatus and method of this invention may be achieved by disabling it or otherwise bypassing it, such as by grounding its output.

Figure 4:
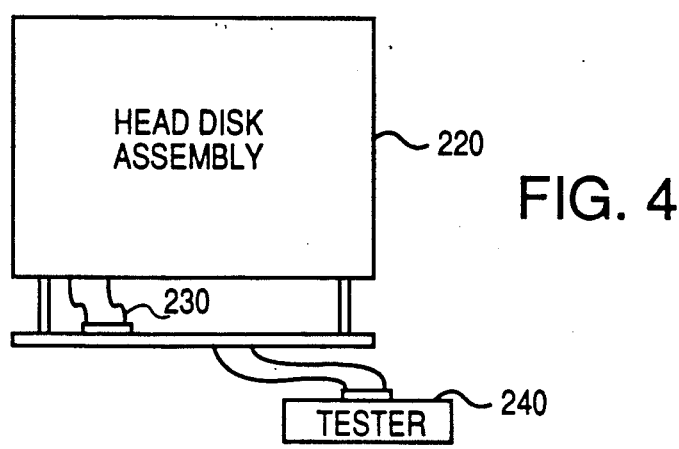
FIG. 4 shows a conventional head disk assembly and testing apparatus, modified to incorporate features of the present invention.

In the diagram of FIG. 4, a head disk assembly 220 is connected via a connecting ribbon or flex cable 230 to a tester 240. The bypassing or disablement of the write unsafe line may be accomplished by bypassing, disconnecting, or grounding the appropriate line in the ribbon 230. By doing this, the present invention may simultaneously access both a head associated with the chip 90—such as head 36, 38, 46 or 48—and the corresponding head (56, 58, 66, or 68; and 76, 78, 86 or 88, respectively) coupled to the other chips 100 and 110, respectively.

It will be understood, therefore, that the present method and apparatus bear an important difference from those presently in use, in that in standard systems the amplifiers (or chips) and the read/write heads must be selected one at a time, so that only a single chip may be accessed either for reading or writing at a given time, whereas the present system selects all of the chips in a stack at one time. Typically, for the writing of data input by a user or peripheral device, one-at-a-time access is sufficient and even desirable, because a given block of data should be stored by means of the disk drive in only one location, e.g. on only one disk. For testing purposes, however, applicants have designed the present system for simultaneous writing by means of a plurality of chips, since the test data may be identical for all tracks in a cylinder.

Figure 2:
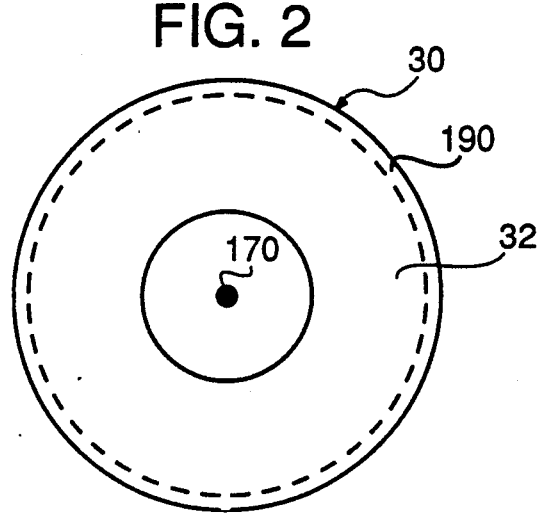
FIG. 2 is a top view taken along line 2—2 of FIG. 1.

In the testing process, then, a standardized form of write data is written onto each track of each disk. In order to carry out the write process, chip select lines 120, 130 and 140 are all activated, and a head select code will be supplied to bus 160 for choosing, for instance, heads 36, 56, and 76. Then the test data is written onto the first track of each of the upper sides 32, 52, and 72. The first track 190 of side 32 of the disk 30 is shown in FIG. 2, and the first tracks of each of the other disks are substantially coaxial with track 190. Other, inner tracks are of smaller diameter.

The write procedure is repeated for heads 38, 58 and 78; 46, 66 and 86; and 48, 68 and 88, thus writing the test data onto the first track of each of the surfaces. This constitutes the first "cylinder." Once the first cylinder is written, the heads are moved inwardly by one track, and the write process is repeated for test data for the second cylinder, i.e., the second track on each of the disk surfaces. The heads are moved in a radial direction relative to the disks, by means of a conventional head transport mechanism 260. This is done until each of the cylinders is written with the test data.

Thus, there is a four-step process in writing the test data onto each cylinder, in that, although all of the amplifiers 90-110 are being accessed simultaneously, in this embodiment only one of the four heads connected to each amplifier is being accessed at a given time. In an alternative embodiment, more than one head per chip may be accessed at a time. In such an embodiment, the write process may be carried out simultaneously for all of the read/write heads as well as for all of the chips, such that only N revolutions are required to complete the write process, where N is the number of tracks on one side of a disk.

The total number of revolutions for the stack 20 for writing all the cylinders is the number of heads per amplifier times the number of tracks per disk, which in this case results in a total number of rotations for the write process of 4N. In the embodiment of FIG. 1, this is only one-third the number of revolutions required in conventional apparatus, which would normally require 12N revolutions to complete the write process, since the chips must be selected one at a time. Thus, the number of revolutions required for the write process in the present invention is reduced by a factor of three, equal to the total number of amplifiers used to access the read/write heads.

Use of the present system results in a reduction of the number of required revolutions by a factor equal to the total number of chips in any given assembly. For example, in a disk drive having twenty-four disks accessed by twelve chips, with N tracks per disk side, in the conventional process 48N rotations of the stack would be required to write the test data on all of the tracks of all of the disks. In the present invention, this is reduced by a factor of twelve (i.e., the total number of chips), such that only 4N rotations would be required to write all of the test data onto all of the tracks of the disks. This results in a considerable savings in time and expense in writing the test data onto the disks.

Once all of the tracks of the disks 30–80 have been written, they are then read out via the read/write heads, and the data is provided to the microprocessor 150 via the output line 210. Both the heads 36–88 and the amplifiers 90–110 are accessed serially for this process, such that in the embodiment of FIG. 1, 12N revolutions are utilized to read all of the tracks of all of the disks 30–80. The analysis of the output data is carried out after the data is read out, and the output data is compared to the input data in a conventional fashion for detecting errors or faults of the disk surfaces.

It will be understood from the above that the total number of revolutions required for the read process plus the write process in the embodiment of FIG. 1 is $4N+12N=16N$ for the present invention, vis-a-vis $12N+12N=24N$ for prior systems.

Figure 3:
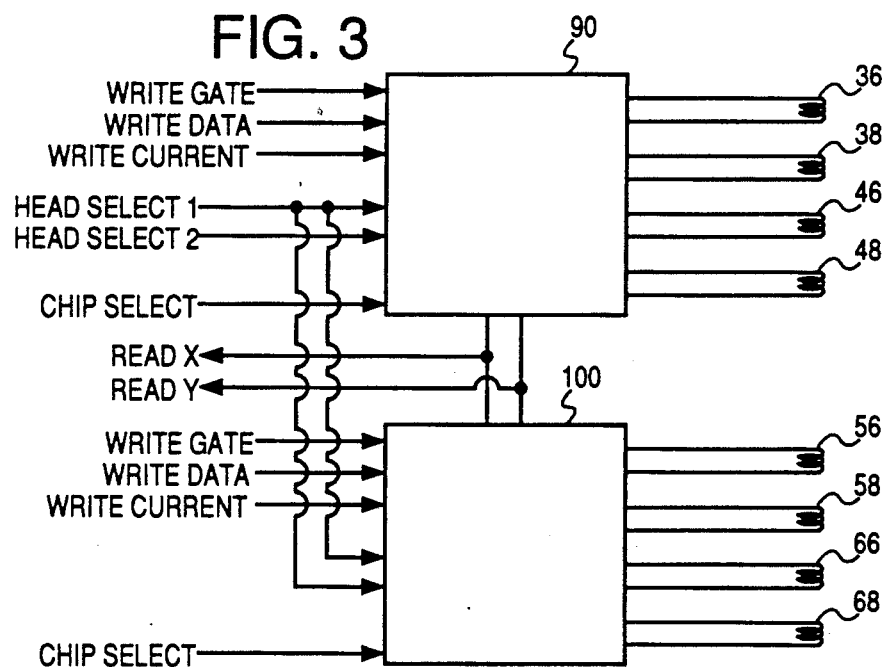
FIG. 3 is a block diagram showing an alternative to the embodiment of FIG. 1.

The diagram of FIG. 3 is illustrative of the commands which are utilized in carrying out the method of the invention. FIG. 3 shows only the amplifiers 90 and 100, although additional amplifiers such as amplifier 110 could be added in similar fashion.

In order to write onto the disks by means of the heads 36 through 68 shown in FIG. 3, the control circuitry or microprocessor provides a WRITE GATE signal, a WRITE DATA signal and a WRITE CURRENT signal, which are conventional in nature. Also, a CHIP SELECT signal is provided, which selects which chip (90 or 100) is to be used, and one head is selected via the HEAD SELECT 1 and HEAD SELECT 2 lines, each of which carries one head select bit.

Once the heads have written data onto the tracks of the disks, the data is then read out by providing READ GATE, READ DATA and READ CURRENT signals, which are provided over the same lines as the WRITE GATE, WRITE DATA and WRITE CURRENT signals, and typically the READ signals will be the opposite states of the WRITE signals, which are binary in nature. The read back signals are provided by the amplifiers 90 and 100 over the READ X and READ Y lines, and are used in the comparison process for testing the tracks, as discussed above.

Variations on the foregoing embodiments of the present invention may be made without departing from the scope of the invention.

What is claimed is:

1. A method for writing to a plurality of memory disks in a head disk assembly, the assembly including a plurality of read/write heads associated with surfaces of said disks, the assembly further including a plurality of read/write control chips, each chip being for controlling a number of the read/write heads and each chip including a chip select line, at least one head select bus, and data input lines and data output lines, said assembly being configured so that different data signals may not be supplied to said read/write heads simultaneously, the method including the steps of:

(1) selecting a plurality of the chips by selecting a plurality of the chip select lines simultaneously, for causing each of the selected chips to enable at least one head controlled thereby to write onto its associated surface;

(2) providing a first head select signal on each said head select bus for selecting a first said head for each said chip; and (3) providing write data over said data input lines for writing onto a track of a surface associated with each said first head, said write data being identical for each said first head.

2. The method of claim 1, further including, after step 3, the step of:

(4) reading the data written onto each said track.

3. The method of claim 2, further including, after step 4, the step of analyzing said data as read out for detecting any errors therein introduced during any of steps 1 through 4.

4. The method of claim 2, wherein the assembly further includes a read control line and a write control line connected to each said chip, and wherein:

step 3 includes the step of providing a write signal at each said write control line; and step 4 includes the step of providing a read signal at each said read control line.

5. The method of claim 1, further including, after step 3, the steps of:

(5) providing a second head select signal on each head select bus for selecting a second said head for each said chip; and (6) providing said write data over said data input lines for writing onto a track of a surface associated with each said second head.

6. The method of claim 5, wherein each said chip controls the same number of read/write heads, further including the step of:

(7) carrying out each of steps 1, 2, 3, 5 and 6 for a number of times equal to said number of heads controlled by each said chip.

7. The method of claim 1, wherein each said disk includes a number of tracks, and including the step of carrying out each of steps 1 through 3 for a number of times equal to the number of tracks on each disk.

8. The method of claim 1, including the step of carrying out steps 1 through 3 for a number of times equal to a total number of heads controlled by the plurality of chips, divided by the number of chips in the assembly, times a total number of tracks per disk, such that each said track is written once.

9. The method of claim 1, wherein each said chip is configured for controlling a plurality of associated heads simultaneously, and wherein step 2 includes the step of selecting said plurality of said heads for each said chip.

10. A method for simultaneously testing a plurality of memory devices, each said device including at least one storage structure for storage of data, said devices being arranged into an assembly having a plurality of read/write apparatuses, with at least one such apparatus coupled to each said storage structure, said assembly including a plurality of read/write controllers for controlling said apparatuses, said assembly being configured so that different data signals may not be supplied to said read/write apparatuses simultaneously, with each said controller connected to one group of said storage structures, including the steps of:
  (1) inputting data through all of said controllers simultaneously to a first said read/write apparatus of each said group, said data being identical for each of said controllers;
  (2) storing said data on a first said storage structure of each said read/write apparatus; and
  (3) reading out, through said controller, said data from each said storage structure.

11. The method of claim 10, further including, after step 3, the step of:
  (4) comparing said data as read out with the data as input for detecting flaws in said storage structures.

12. The method of claim 11, wherein each group has the same number of storage structures, further including the step of:
  carrying out steps 1 through 4 a number of times equal to the number of read/write apparatuses in said assembly, divided by the number of read/write controllers in said assembly.

13. An apparatus for detecting flaws in computer disks, the disks being included in a head disk assembly, where the assembly includes a first read/write head associated with a first surface of each disk and a second read/write head associated with a second surface of each disk, the assembly further including a plurality of head control chips for controlling read and write operations of the heads, where a predetermined number of heads is controlled by each such chip, said assembly being configured so that different data signals may not be supplied to said heads simultaneously, the apparatus comprising:
  means for simultaneously providing a write signal to all of the first heads for storing identical data on said first surfaces;
  means for reading said data from said first surfaces via said first heads; and
  means for comparing said read data with said written data for detecting the presence of flaws on said first surfaces of said computer disks.

14. The apparatus of claim 13, wherein;
  said providing means is also for providing a write signal to each of said second heads for storing data on said second surfaces;
  said reading means is also for reading said data from said second surfaces via said second heads; and
  wherein said comparing means is also for comparing said data read from said second surfaces with said data as written onto said second surfaces, for detecting the presence of flaws on said second surfaces of said computer disks.

15. The apparatus of claim 14, wherein said assembly includes:
  at least one head select bus connected to each said head control chip, for causing each said chip to select one of said first and second heads; and
  a head data line connected to each said head, for providing data to each said head;
  and wherein said providing means includes an input line connected to each said head control chip for providing input data to said chip and thence to said head data line.

16. The apparatus of claim 15, wherein:
  said head data line is also for providing data which is read by each said head to said chip; and
  said reading means includes an output line connected to each said head control chip for providing output data obtained from said head data line to said comparing means.

17. The apparatus of claim 16, wherein each said input line is connected to each other input line, for simultaneously providing the same data to all of said first heads or all of said second heads simultaneously.

* * * * *